(12) United States Patent
Muir

(10) Patent No.: US 6,599,259 B2
(45) Date of Patent: Jul. 29, 2003

(54) COMPUTER INPUT DEVICE HAVING MASSAGING ELEMENTS

(75) Inventor: Brett J. Muir, Pacifica, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/874,722

(22) Filed: Jun. 4, 2001

(65) Prior Publication Data

US 2002/0183658 A1 Dec. 5, 2002

(51) Int. Cl.$^7$ ................................................. A61H 1/00
(52) U.S. Cl. ............................................ 601/46; 345/163
(58) Field of Search ............................ 601/46, 48, 67, 601/69, 1, 84; 345/163, 166

(56) References Cited

U.S. PATENT DOCUMENTS

| | | | |
|---|---|---|---|
| 4,414,963 A | | 11/1983 | Kunz |
| 4,491,127 A | | 1/1985 | Yamamura et al. |
| 4,612,539 A | | 9/1986 | Hosogoe et al. |
| 5,008,528 A | | 4/1991 | Duchon |
| 5,065,743 A | | 11/1991 | Sutherland |
| 5,083,552 A | * | 1/1992 | Lipowitz ........................ 601/1 |
| 5,127,708 A | * | 7/1992 | Kishi et al. ............... 297/284.1 |
| 5,304,112 A | * | 4/1994 | Mrklas et al. ............... 434/236 |
| 5,305,738 A | | 4/1994 | Shimizu |
| 5,356,369 A | | 10/1994 | Yamasaki et al. |
| 5,447,491 A | | 9/1995 | Bellandi |
| 5,543,821 A | | 8/1996 | Marchis et al. |
| 5,564,844 A | * | 10/1996 | Patterson, Jr. et al. ...... 400/492 |
| 5,583,541 A | | 12/1996 | Solhjell |
| 5,686,005 A | | 11/1997 | Wright, Sr. |
| 5,692,956 A | * | 12/1997 | Rifkin .......................... 463/37 |
| 5,696,537 A | | 12/1997 | Solhjell |
| 5,767,841 A | | 6/1998 | Hartman |
| 5,857,986 A | * | 1/1999 | Moriyasu ..................... 601/49 |
| 6,011,543 A | | 1/2000 | Tian |
| 6,039,702 A | | 3/2000 | Cutler et al. |
| 6,077,238 A | | 6/2000 | Chung |
| 6,094,190 A | | 7/2000 | Kodim |
| 6,120,468 A | * | 9/2000 | Tseng ........................... 601/46 |
| 6,135,399 A | | 10/2000 | Savoie et al. |
| 6,210,349 B1 | | 4/2001 | Naruse et al. |
| 6,282,655 B1 | * | 8/2001 | Given ......................... 340/540 |
| 6,323,841 B1 | * | 11/2001 | Lai ............................. 345/163 |

FOREIGN PATENT DOCUMENTS

| | | | |
|---|---|---|---|
| JP | 4304517 | * | 10/1992 |
| JP | 7191803 | * | 7/1995 |

OTHER PUBLICATIONS

"Johanson's Flexible Electric Heaters"; ©2001 Johanson DMS, Inc., Port Orange, FL.

* cited by examiner

*Primary Examiner*—Justine R. Yu
(74) *Attorney, Agent, or Firm*—Meyertons, Hood, Kivlin, Kowert & Goetzel, P.C.; Eric B. Meyertons

(57) ABSTRACT

A computer input device configured to provide massage stimuli to a user is disclosed. The massage stimuli may include stroking, compression, kneading, squeezing or percussion of a soft body tissue of a user of the input device. Characteristics of the massage stimuli such as intensity, frequency, location, and pattern of the massage stimuli application may be controlled by the user. In some embodiments, characteristics of the massage stimuli may be automatically controlled by a microcontroller or computer.

21 Claims, 3 Drawing Sheets

COMPUTER INPUT DEVICE HAVING MASSAGING ELEMENTS

BACKGROUND OF THE INVENTION

1. Field of the Invention

Embodiments disclosed herein generally relate to computer input devices.

2. Description of Related Art

Computer use has become an important productivity improvement tool in the United States and throughout the world. In general, it would be difficult to imagine the operation of a business without the predominant use of computers. Internet-based commerce, often referred to as e-commerce, has provided further impetus to the widespread use of a computer in home and in the business.

It is not uncommon for a person to work with a computer for a majority of a workday. A computer user may provide input to a computer by actuating an input device. An input device may include a stationary mouse (commonly called a trackball), a movable mouse, a keyboard, etc. Continuous operation of such a device over a substantial period of time may result in fatigue and discomfort. Such fatigue and discomfort may result in absenteeism and/or in decreased productivity. The widespread use of computer input is believed to have contributed to a significant increase in incidences of a repetitive motion stress injuries.

Continuous extension of a one's hand away from one's body may be required when performing certain tasks on a computer. For example, data entry personnel, writers, graphic designers, etc. may use computer input devices for long periods at a time. Such use of computer input devices may require the user's hand or hands to be extend away from their body. Continuous extension of one's hand is believed to contribute to muscular rigidity.

Muscular rigidity may contribute to a variety of concerns. For example, it is believed that muscular rigidity may reduce lymphatic system function. Such reduction in lymphatic system function may reduce the body's ability to effectively remove cellular wastes. Muscular rigidity may also cause muscle spasms, loss of flexibility, and loss of elasticity in the affected muscles. Muscular rigidity in a set of muscles may contribute to muscular tension and fatigue throughout the body.

The following patents related to computer input devices and massaging devices are hereby incorporated by reference: U.S. Pat. No. 4,491,127 to Yamamura et al.; U.S. Pat. No. 5,065,743 to Sutherland; U.S. Pat. No. 5,356,369 to Yamasaki et al.; U.S. Pat. No. 5,305,738 to Shimizu; U.S. Pat. No. 5,447,491 to Bellandi; U.S. Pat. No. 6,210,349 to Naruse et al.; and U.S. Pat. No. 4,414,963 to Kunz.

SUMMARY OF THE INVENTION

Embodiments disclosed herein relate to computer input devices configured to massage a hand of a user. In an embodiment, the characteristics of the massage stimulus provided to the user may be controlled by the user. In an embodiment, the characteristics of the massage stimulus provided to the user may be controlled by a microprocessor, or a computer to which the input device is coupled.

An advantage of embodiments disclosed herein may be that providing massage stimuli to a user's hand may stimulate circulation in the user's hand. Another advantage may be that providing massage stimuli to a user's hand may reduce muscular rigidity. A further advantage of embodiments disclosed herein may be that their use may reduce fatigue associated with long-term use of a computer input device.

BRIEF DESCRIPTION OF THE DRAWINGS

Further advantages of the present invention will become apparent to those skilled in the art with the benefit of the following detailed description of embodiments and upon reference to the accompanying drawings wherein.

Figure 1:
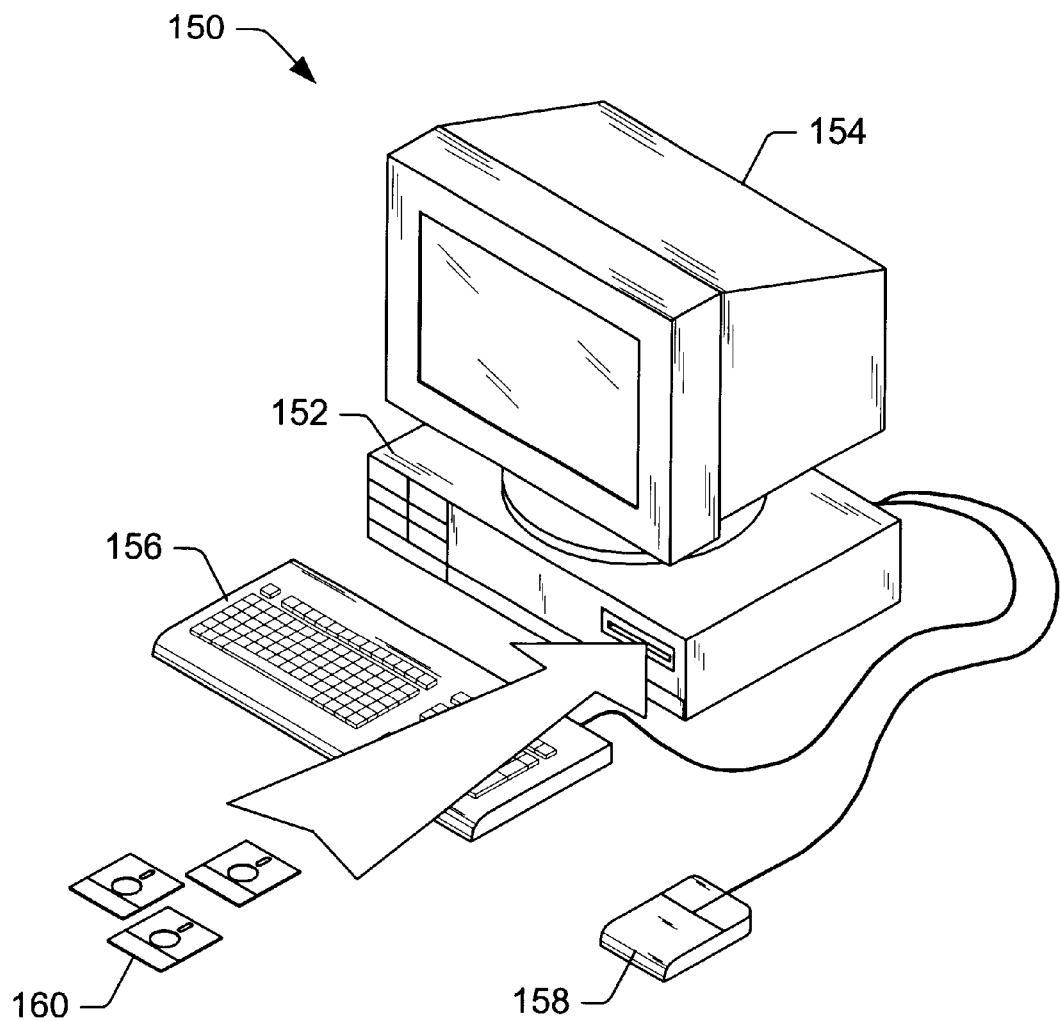
FIG. 1 is a schematic view of an embodiment of a computer system.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and input/output (I/O) devices. As used herein, the term "processor" generally describes the logic circuitry that responds to and processes the basic instructions that operate a computer system. The term "memory medium" includes an installation medium, e.g., a CD-ROM, floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for the reception, storage, analysis, and transmittal of information produced by an Analyte Detection Device (ADD). The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

FIG. 1 depicts an embodiment of a computer system 150. Computer system 150 may include components such as a CPU 152 with an associated memory medium such as floppy disks 160, CD-ROMs, or hard disk (not shown). Computer system 150 may further include a display device such as monitor 154. Additionally computer system 150 may include one or more input devices such as a keyboard 156, mouse 158, trackball (not shown), or joystick (not shown).

A massage stimulus is herein defined as stroking, compression, kneading, squeezing, and/or percussion of soft body tissues. A massage stimulus may have a variety of characteristics which may depend on the type of massage stimulus. In general a massage stimulus may have characteristics such as intensity, frequency, location, and pattern of the stimulus application. Massage stimulus intensity is defined herein as how hard or soft the stimulus is perceived to be. Massage stimulus frequency is defined herein as how frequently the massage stimulus is applied or repeated. Massage stimulus location is defined herein as where the massage stimulus is applied. Massage stimulus pattern is defined herein as the pattern of repetition.

Massage stimuli may be produced mechanically. In an embodiment, a massaging element may be configured to produce a stroking, compression, kneading, squeezing, and/or percussion of soft body tissues. In an embodiment, a massaging element may be configured to produce a combination of two or more of these massage stimuli.

Figure 3A:
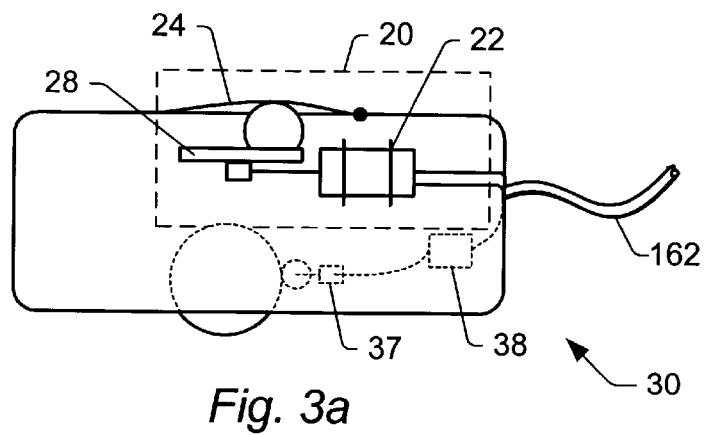
FIGS. 3a, 3b, 3c, 3d, and 3e are a partial cut-away side views of embodiments of a computer input device.
Figure 3B:
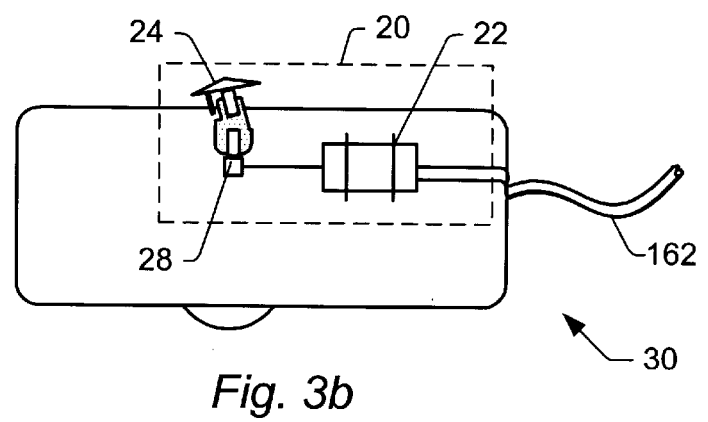
Figure 3C:
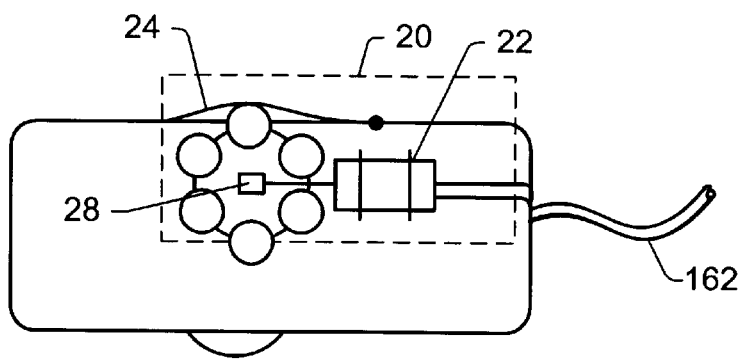
Figure 3D:
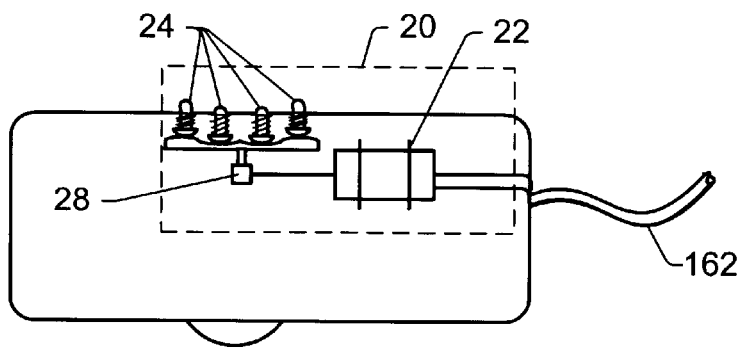
Figure 3E:
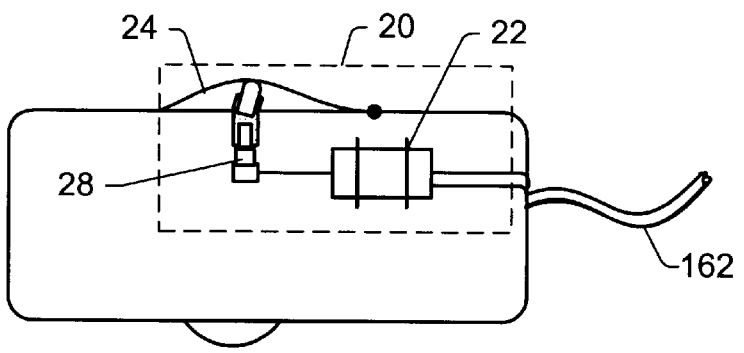

Referring now to FIGS. 3a through 3e, an input device may be referenced by numeral 30. In an embodiment, input device 30 may include one or more massaging element 20. In embodiment, massaging element 20 may include an electric motor 22 coupled to one or more contact members 24. A contact member is herein defined as a member of a massaging element which is configured to come into contact with a user's skin. A contact member may be a movable ball, a movable nub or finger (as depicted in FIGS. 3b and 3d), a pliable sheet or film (as depicted in FIGS. 3a, 3c and 3e), etc. As a user is using input device 30, massaging element 20 may provide massage stimuli to a portion of the user's skin which contact member 24 contacts.

Massaging element 20 may also include transmissive apparatus 28 coupling electric motor 22 to contact member 24. Transmissive apparatus are herein defined as devices configured to direct or modify the motion of a rotating motor such that a desired massage stimulus is produced by a contact member. For example, transmissive apparatus may include gears (as in FIGS. 3a–3e), wheels (as in FIGS. 3a, 3c, and 3d), springs (as in FIG. 3d), shafts (as in FIGS. 3a–3e), etc. The configuration of transmissive apparatus may vary based on the type of massage stimuli desired to be produced by the massaging element.

Input device 30 may include cable 162. Cable 162 may include at least one conductor, to electrically couple input device 30 to computer system 150. In an embodiment, cable 162 may include additional conductors. The additional conductors may be electro-magnetically shielded, and/or electrically isolated from the conductor carrying input signals from input device 30 to computer system 150. The additional conductors may be used to supply power from computer system 150 to massaging element 20. In some embodiments, the same conductor or conductors may be used to provide both power to massaging element 20, and input signals from input device 30 to computer system 150.

For example, an input signal from input device 30 to computer system 150 may be electrically superimposed on a signal providing power to massaging element 20. In an embodiment, massaging element 20 may be provided with a source of power external to computer system 150. Computer system 150 may be configured to control such an external power source.

Figure 2:
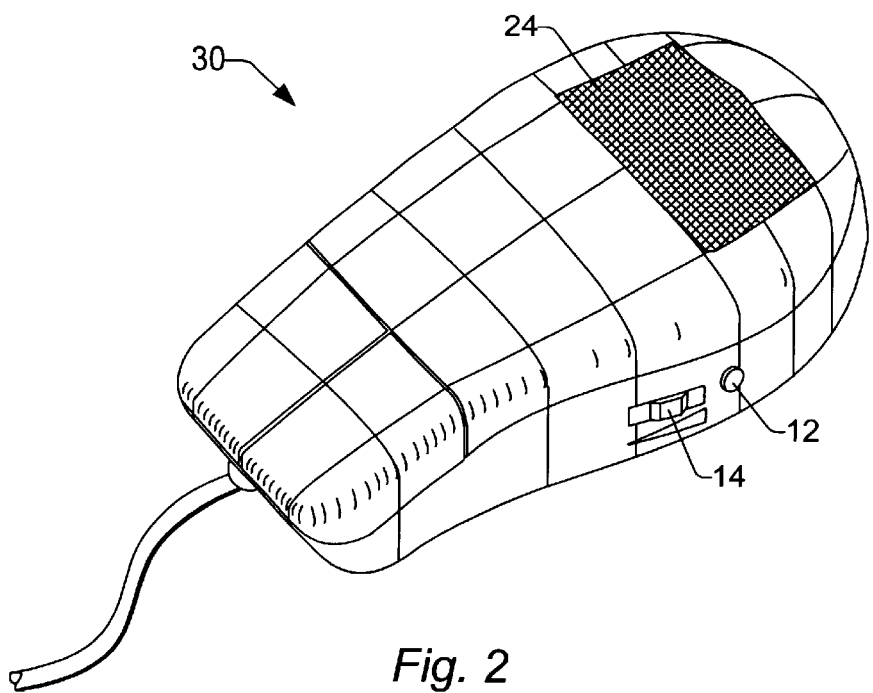
FIG. 2 is a perspective view of an embodiment of a mouse having manual controls on the side.

In an embodiment (an example of which is depicted in FIG. 2), a conventional on/off switch 12 may be used to turn on and/or off massaging element 20. In an embodiment, rheostat 14 may be configured to allow a user to control one or more massage stimulus characteristic of massaging element 20. In an embodiment, computer system 150 may be configured to detect the use of input device 30. For example, where input device 30 is a mouse or trackball, computer system 150 may detect motion of the mouse or trackball. For example, input device 30 may include a motion sensor 37 (as depicted in FIG. 3a). In a case where input device 30 is a keyboard, computer system 150 may detect pressing of one or more keys on the keyboard. When the use of input device 30 is detected, computer system 150 may send a signal to turn on massaging element 20. The signal to turn on the massaging element may be as soon as the signal is detected or at a predetermined time after the signal is detected. Computer system 150 may be configured to turn off massaging element 20 after a predetermined period of use of input device 30. In an embodiment, microcontroller 38 may be configured to detect the use of input device 30. In such an embodiment, microcontroller 38 may send a signal to turn on or turn off massaging element 20 when the use of input device 30 is detected.

In an embodiment, computer system 150 may be provided with a computer software program configured to control one or more massage stimulus characteristics of input device 30. Computer system 150 may be coupled to input device 30 via cable 162. Computer system 150 may execute the computer software program to control one or more massage stimulus characteristics of input device 30. In an embodiment, the computer software program may generate a graphical user interface. The graphical user interface may be configured to display one or more massage stimulus characteristics of input device 30. The graphical user interface may include a color graphic display on display monitor 154. The graphical user interface may include one or more present massage stimulus characteristics of input device 30. In an embodiment, the graphical user interface may include one or more desired or target massage stimulus characteristics of input device 30.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer mouse, comprising:
   at least one motion sensor for detection of using the mouse; at least one massaging element configured to provide at least one massage stimulus to a user's hand in response to signal generated by said at least one motion sensor; and at least one switch which controls at least one characteristic of at least one massage stimulus provided to the user's hand, during use.

2. The computer mouse of claim 1, further comprising a microcontroller coupled to said at least one massaging element, wherein the microcontroller is configured to provide a control signal to said at least one massaging element, during use.

3. The computer mouse of claim 1, further comprising a microcontroller coupled to said at least one massaging element and said at least one motion sensor, wherein the microcontroller is configured to operate said at least one massaging element in response to input from at least one motion sensor.

4. The computer mouse of claim 1, further comprising at least one cable, wherein said at least one cable is configured to provide communication between the computer mouse and a computer system, during use, and wherein the cable is further configured to provide power to said a least one massaging element, during use.

5. The computer mouse of claim 1, wherein the computer mouse is configured to receive a control signal from a computer system.

6. The computer mouse of claim 1, wherein said at least one massaging element comprises at least one contact member.

7. The computer mouse of claim 1, wherein said at least one massaging element comprises a movable finger.

8. The computer mouse of claim 1, wherein said at least one massaging element comprises a movable ball.

9. The computer mouse of claim 1, wherein said at least one massaging element comprises a transmissive apparatus.

10. The computer mouse of claim 1, wherein said at least one massaging element comprises at least one electric motor coupled to a contact member, wherein said at least one electric motor is configured to move the contact member to produce at least one massage stimulus, during use.

11. A computer input device, comprising:

at least one motion sensor configured to detect use of the computer input device;

at least one massaging element configured to provide massage stimuli to a user's hand in response to detection of use of the computer input device by said at least one motion sensor; and at least one switch which controls at least one characteristic of at least one massage stimulus provided by the said at least one massaging element to the user's hand, during use.

12. The computer input device of claim 11, further comprising a microcontroller, wherein the microcontroller is configured to receive a signal from the at least one motion sensor indicating detection of use of the computer input device, and wherein the microcontroller is further configured to provide a control signal to the at least one massaging element, in response to the signal received from the at least one motion sensor.

13. The computer input device of claim 11, further comprising at least one cable, wherein said at least one cable is configured to provide communication between the computer input device and a computer system, during use, and wherein the cable is further configured to provide power to said at least one massaging element, during use.

14. The computer input device of claim 11, wherein the computer input device is configured to receive a control signal from a computer system.

15. The computer input device of claim 11, wherein said at least one massaging element comprises at least one contact member.

16. The computer input device of claim 11, wherein said at least one massaging element comprises a movable finger.

17. The computer input device of claim 11, wherein said at least one massaging element comprises a movable ball.

18. The computer input device of claim 11, wherein said at least one massaging element comprises a transmissive apparatus.

19. The computer input device of claim 11, wherein said at least one massaging element comprises at least one electric motor coupled to a contact member, wherein said at least one electric motor is configured to move the contact member to produce at least one massage stimulus, during use.

20. The computer input device of claim 11, wherein the computer input device comprises a mouse.

21. The computer input device of claim 11, wherein the computer input device comprises a keyboard.

* * * * *